United States Patent
Gehring (10) Patent No.: US 7,319,278 B2
(45) Date of Patent: Jan. 15, 2008

(54) OCEAN WAVE GENERATION

(76) Inventor: Donald Hollis Gehring, 14690 Old Conroe Rd., Conroe, TX (US) 77384

( * ) Notice: Subject to any disclaimer, the term of this patent is extended or adjusted under 35 U.S.C. 154(b) by 101 days.

(21) Appl. No.: 11/142,145

(22) Filed: Jun. 1, 2005

(65) Prior Publication Data

US 2006/0273594 A1   Dec. 7, 2006

(51) Int. Cl.
*F03B 13/10* (2006.01)
(52) U.S. Cl. .......................... 290/53; 290/42
(58) Field of Classification Search ................ 290/53
See application file for complete search history.

(56) References Cited

U.S. PATENT DOCUMENTS

| | | | |
|---|---|---|---|
| 2,160,756 A | | 5/1939 | Schreck |
| 2,501,696 A | * | 3/1950 | Souczek ........................ 290/43 |
| 3,567,953 A | * | 3/1971 | Lord ............................ 290/42 |
| 4,208,877 A | * | 6/1980 | Evans et al. ................... 60/495 |
| 4,228,360 A | * | 10/1980 | Navarro ........................ 290/43 |
| 4,242,593 A | * | 12/1980 | Quilico et al. ................. 290/53 |
| 4,340,821 A | * | 7/1982 | Slonim ......................... 290/53 |
| 4,520,273 A | | 5/1985 | Rowe |
| 4,551,066 A | | 11/1985 | Frisz |
| 4,717,831 A | | 1/1988 | Kikuchi |
| 4,850,190 A | * | 7/1989 | Pitts ............................ 60/398 |
| 5,066,867 A | | 11/1991 | Shim |
| 5,424,582 A | * | 6/1995 | Trepl et al. .................... 290/53 |
| 6,531,788 B2 | | 3/2003 | Robson |
| 6,695,536 B2 | * | 2/2004 | Sanchez Gomez ........... 405/76 |
| 6,856,036 B2 | * | 2/2005 | Belinsky ....................... 290/42 |
| 7,045,912 B2 | * | 5/2006 | Leijon et al. .................. 290/42 |
| 7,076,949 B2 | * | 7/2006 | Fernandez Gomez et al. ............................ 60/498 |
| 7,199,483 B2 | * | 4/2007 | Lomerson et al. ............. 290/53 |
| 7,215,036 B1 | * | 5/2007 | Gehring ........................ 290/54 |
| 7,245,041 B1 | * | 7/2007 | Olson ........................... 290/53 |
| 2002/0197148 A1 | * | 12/2002 | Belinsky ...................... 415/2.1 |
| 2003/0019207 A1 | * | 1/2003 | Parker .......................... 60/398 |
| 2004/0061338 A1 | | 4/2004 | Woodbridge |
| 2004/0103658 A1 | | 6/2004 | Laveria |
| 2005/0035602 A1 | * | 2/2005 | Gard ............................. 290/53 |
| 2005/0121915 A1 | * | 6/2005 | Leijon et al. .................. 290/42 |
| 2006/0261597 A1 | * | 11/2006 | Gehring ........................ 290/44 |
| 2007/0120371 A1 | * | 5/2007 | Gehring ........................ 290/54 |
| 2007/0164568 A1 | * | 7/2007 | Greenspan et al. ............. 290/53 |

FOREIGN PATENT DOCUMENTS

| | | | |
|---|---|---|---|
| RU | 2004838 C1 | * | 12/1993 |
| SU | 1596125 A | * | 9/1990 |
| SU | 1617182 A | * | 12/1990 |
| WO | WO 9913218 A1 | * | 3/1999 |

OTHER PUBLICATIONS

US 3,695,251, 10/1972, Last et al. (withdrawn)*

* cited by examiner

*Primary Examiner*—Joseph Waks
(74) *Attorney, Agent, or Firm*—Bracewell & Giuliani LLP (57) ABSTRACT

An ocean wave generator includes a buoy for floating on the surface of the ocean. A generator is mounted to the buoy. A pulley is mounted on the generator for turning the generator. An anchor cable has a first end wrapped around the pulley and an anchored second end. Upward movement of the buoy and generator due to a wave causes the cable to unwind from the pulley, which turns the generator. A spring connected to the pulley rewinds the anchor cable when the buoy and generator drop into the trough of a wave.

9 Claims, 7 Drawing Sheets

OCEAN WAVE GENERATION

FIELD OF THE INVENTION

The present invention relates to generators, and in particular to an ocean wave generator that converts ocean waves into electrical energy.

BACKGROUND OF THE INVENTION

Society increasingly is more dependent on energy sources as nations become more advanced. As fuels required to generate energy become expended, man looks to more renewable sources with which to produce energy. Among some of the sources are wind power, solar power, and hydroelectric power. However, an untapped source of renewable energy is the power from harnessing ocean waves.

U.S. Pat. No. 5,066,867 discloses a method and device for generating electric power by use of wave force. According to the invention, it is possible to obtain the required power using the floatation bladders rising and falling repeatedly with waves as a power source and the rotation force of gears connected to the floatation bladders through ropes. The invention has advantages in that the construction of the power generating means and its supporting means are simple, execution of work is easy, a kinetic energy is convertible into an electric energy using the floatation bladders regardless of the magnitude of waves, and even in the deep sea, the base frame is not installed on the sea bed, but in a fixed depth under the mean sea level, and thereby the maintenance and repair of device is carried out without any difficulty.

U.S. Pat. No. 6,531,788 discloses a submersible generating plant for producing electricity from ocean currents. The apparatus consists of two counter-rotating, rear-facing turbines with a plurality of rotor blades extending radially outward from two separate horizontal axis that convey the kinetic energy from the two side-by-side turbine rotors through separate gearboxes to separate generators that are housed in two watertight nacelles that are located sufficiently far apart to provide clearance for the turbine rotors. The two generators and their gearboxes serve as ballast and are located below a streamlined buoyancy tank that extends fore and aft above and between them. A leverage system having no moving parts adjusts lifting forces to balance changing downward vector forces that result from changes in drag acting on the downward angled anchor line.

U.S. Pat. No. 4,717,831 discloses an ocean and river water power generator having a plurality of water wheel power generators. Said water wheel power generator includes a common concrete base, a water wheel having a main shaft thereof and a plurality of water wheel impellers fixedly and radially attached to said main shaft for transforming potential energy of water in the ocean or a river to rotational energy thereof, a speed-up gear means having an input shaft thereof connected with one end of said main shaft for increasing the number of RPM of the main shaft for increasing said rotational energy.

U.S. Patent No. 4,551,066 discloses a water wheel for operating fully submerged in an ocean current. The water wheel has a rotating frame member supported on the ocean floor for rotation about a vertical axis. The frame member supports a plurality of vertically extending vanes, each vane being rotatably supported on the frame for limited rotation about a vertical axis. It has a hydrofoil shape in cross-section with the axis of rotation parallel to the leading and trailing edges. Rotation of the vanes is limited relative to the frame by a hydraulic piston control system and shock absorbers.

U.S. Pat. No. 4,520,273 discloses a rotor generator including an elongated generally cylindrically shaped framework. An elongated rotor is longitudinally aligned within the framework and is rotatably mounted therein. The rotor has a plurality of curved blades which are capable of causing rotation of the rotor when there is fluid flow, such as water or air current. The rotor has a magnetic characteristic which may be provided by attaching magnets to the rotor blades or magnetizing the blades themselves. A plurality of wires are mounted on the framework about the rotor so that when the rotor is rotated electrical current is induced in the wires. Apparatus is provided for collecting the induced electrical current so that the electrical current can be provided for power purposes, such as charging a battery. With this arrangement the rotor generator can be placed on the bottom of the ocean where there is current flow, and utilized for charging a battery which may in turn power oceanographic equipment.

U.S. Patent Application No. 20040061338 is directed towards a reciprocating generator rigidly attached to the underside of an ocean buoy and creates electric power from the surface ocean swells. The generator coil maintains a stable position beneath the ocean surface while the magnetic field housing reciprocates with the vertical motion of the buoy in response to interaction with swell and waves on the surface of the ocean. Damping plates attached to the generator coil inhibit the motion of the generator coil, thus keeping it in a stable position relative to the motion of the magnetic housing. The magnetic housing focuses the magnetic field through the generator coil and the relative motion between the magnetic housing and generator coil creates an electromotive force in the coil. The design of the generator provides a uniform field of single magnetic orientation throughout the entire stroke of the generator. Permanent magnets and electromagnet windings create and enhance the magnetic field of the reciprocating generator.

Canada Patent No. 2,160,756 is directed towards an Ocean Current Power Generator. The abstract for this document was not provided by the issuing authority at the time it was entered into the ICO patent database. Also the image (PDF) file was not available for this document.

U.S. Patent No. 20040103658 is directed towards a system for conversion of wave energy in a body of a fluid using electromagnetic coupling (by moving a magnetic device inside a coil, or a coil inside magnetic field) driven by the linear motion due to either a buoy on a liquid or a linear movement induced by any mechanical means driven by a fluid, including: (a) a stationary support element mounted to the floor or to the floor of the body of the fluid in the form of a magnet or a coil; (b) a moving or buoyancy apparatus, for liquid fluids, including a buoy portion having formed therewith wave energy collection apparatus in the form of a floating device containing a magnet, or a coil; (c) coupling apparatus for connecting the moving or buoyancy apparatus to the stationary support element so as to be pivotal in a generally vertical plane with respect to the stationary support element; (d) at least a set a cables to allow for the flow of the electric current to a control/regulator/storage device, correspondingly, the piston apparatus being guided by a stationary support, in association with a predetermined element operative to move in response to movement of the moving or buoyancy apparatus, or running fluid such as air or running water.

None of the above inventions, however, provide for an ocean wave generator that can be easily inspected, maintained, replaced, and installed, while not reducing the efficiency of the generator. There is therefore a need for an ocean wave generator that can meet these needs and will produce reliable energy.

SUMMARY OF THE INVENTION

It is an aspect of the present invention to provide an ocean wave generator.

It is a further aspect of the present invention to provide an ocean wave generator that has a case having a chamber; a shaft rotatably mounted within the chamber of the case; a stator disposed within the chamber of the case substantially about the periphery of the chamber; a rotor mounted to the shaft, wherein the stator and rotor comprise a generator; a pulley mounted to the shaft whereby when the pulley rotates in a first direction, the pulley rotates the shaft in the first direction, and when the pulley rotates in a second direction, the pulley rotates about the shaft without turning the shaft; an anchor cable mounted to the pulley at one end and anchored to support frame at the other end; a current generator mounted to the support frame; a mooring line connected to the support frame at one end and moored to a mooring anchor on the seabed at another end; a coil spring mounted to the pulley, which rotates the pulley in the second direction and winds the one end of the anchor cable around the pulley; a flywheel mounted on the shaft; and power cables in electrical communication with the generator.

It is yet a further aspect of the present invention to provide an ocean wave generator having a case having a chamber; a shaft rotatably mounted within the chamber of the case; a stator disposed within the chamber of the case substantially about the periphery of the chamber; a rotor mounted to the shaft, wherein the stator and rotor comprise a generator; a pulley mounted to the shaft whereby when the pulley rotates in a first direction, the pulley rotates the shaft in the first direction, and when the pulley rotates in a second direction, the pulley rotates about the shaft without turning the shaft; an anchor cable mounted to the pulley at one end and anchored to support frame at the other end; a current generator mounted to the support frame; a mooring line connected to the support frame at one end and moored to a mooring anchor on the seabed at another end; a coil spring mounted to the pulley, which rotates the pulley in the second direction and winds the one end of the anchor cable around the pulley; a flywheel mounted on the shaft; and power cables in electrical communication with the generator.

In accordance with an aspect of the present invention, an ocean wave generator is provided. The ocean wave generator includes a buoy, floating on the surface of the ocean; a generator; a pulley mounted on the generator for turning the generator; an anchor cable having a first end and a second end, wherein the first end of the anchor cable is connected to the underside of the buoy and the second end is mounted to the pulley; and a power cable, in electrical communication with the generator.

In accordance with a further aspect of the present invention, a novel ocean wave generator is provided. The novel ocean wave generator includes a case having a chamber; a shaft rotatably mounted within the chamber of the case; a stator disposed within the chamber of the case substantially about the periphery of the chamber; a rotor mounted to the shaft, wherein the stator and rotor comprise a generator; a pulley mounted to the shaft whereby when the pulley rotates in a first direction, the pulley rotates the shaft in the first direction, and when the pulley rotates in a second direction, the pulley rotates about the shaft without turning the shaft; an anchor cable mounted to the pulley at one end and anchored to support frame at the other end; a current generator mounted to the support frame; a mooring line connected to the support frame at one end and moored to a mooring anchor on the seabed at another end; a coil spring mounted to the pulley, which rotates the pulley in the second direction and winds the one end of the anchor cable around the pulley; a flywheel mounted on the shaft; and power cables in electrical communication with the generator.

In accordance with yet a further aspect of the present invention, a novel ocean wave generator is provided. The novel ocean wave generator includes a case having a chamber; a shaft rotatably mounted within the chamber of the case; a stator disposed within the chamber of the case substantially about the periphery of the chamber; a rotor mounted to the shaft, wherein the stator and rotor comprise a generator; a pulley mounted to the shaft whereby when the pulley rotates in a first direction, the pulley rotates the shaft in the first direction, and when the pulley rotates in a second direction, the pulley rotates about the shaft without turning the shaft; an anchor cable mounted to the pulley at one end and anchored to support frame at the other end; a current generator mounted to the support frame; a mooring line connected to the support frame at one end and moored to a mooring anchor on the seabed at another end; a coil spring mounted to the pulley, which rotates the pulley in the second direction and winds the one end of the anchor cable around the pulley; a flywheel mounted on the shaft; and power cables in electrical communication with the generator.

BRIEF DESCRIPTION OF THE DRAWINGS

The foregoing summary, as well as the following detailed description of a preferred embodiment of the present invention will be better understood when read with reference to the appended drawings, wherein.

DETAILED DESCRIPTION OF THE PREFERRED EMBODIMENT

Figure 1:
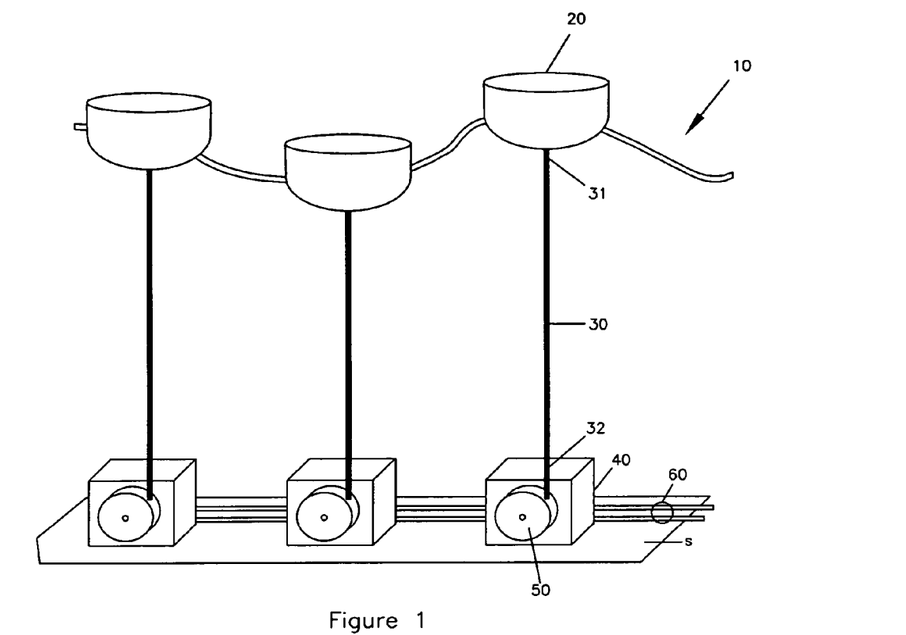
FIG. 1 is a schematic representation of an ocean wave generator in accordance with the present invention.
Figure 2:
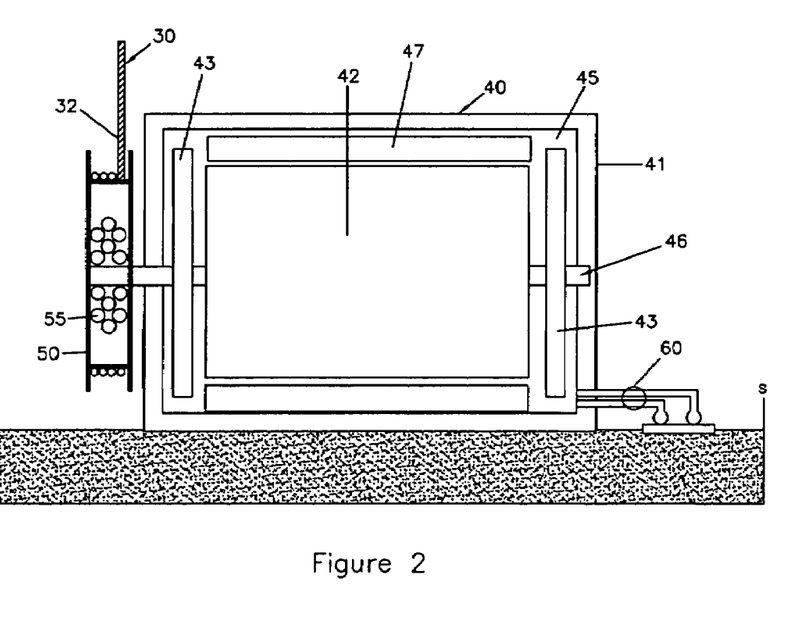
FIG. 2 is a partial cross-sectional view of a generator component of the ocean wave generator of FIG. 1.

Referring now to the drawings, wherein like reference numerals refer to the same components across the several views and in particular to FIGS. 1 and 2, there is shown an ocean wave generator 10. The ocean wave generator 10 includes a buoy 20, an anchor cable 30, a generator 40, a pulley 50, and power cables 60.

The buoy 20 floats on the surface of the ocean and rises and falls as the waves rise and fall. The anchor cable 30 is connected to the underside of the buoy 20 at a first end 31. A second end 32 is connected to the pulley 50, which is mounted on the generator 40.

The generator 40 includes an outer case 41 and an inner chamber 45. The inner chamber 45 of the generator 40 houses a rotor 42 which turns to generate electricity. The rotor 42 is connected to a shaft 46. Disposed at one end of the shaft 46 is the pulley 50. The second end 32 of the anchor cable 30 is wrapped around the pulley 50. As the buoy 20 rises and falls, the anchor cable 30 rotates the pulley 50, and the shaft 46, which in turn rotates the rotor 42 within a stator 47, thereby generating electricity.

The operation of the pulley 50 is more fully described as follows. The pulley 50 is mounted on the shaft 46 such that when the pulley 50 rotates in a first direction, the pulley 50 rotates the shaft 46, and thereby rotates the rotor 42. When the pulley 50 rotates in a second, and opposite direction of rotation from the first direction, the pulley 50 rotates freely about the shaft 46, without turning the shaft 46 in the second direction. In a preferred embodiment of the present invention, the pulley 50 rotates in the first direction during the rising of the buoy 20 during an ocean wave crest, which pulls the anchor cable 30 in an upward direction. As the buoy 20 falls during an ocean wave trough, a coil spring 55 winds the second end 32 of the anchor cable 30 back around the pulley 50 preparing it for the next pull. The generator 40 has a set of power cables 60 connected to it to transfer the energy generated in the generator 40 for consumption.

A flywheel 43 mounted inside the case 41 and to the shaft 46 continues to rotate the rotor 42 during the ocean wave troughs. In this manner, the rotor 42 is able to rotate during both ocean wave crests and troughs, and thereby generate a more constant power output. The case 41 in a preferred embodiment is sealed to avoid corrosion and degradation of the components within the chamber 45, and is filled with an inert gas such as nitrogen.

Figure 3:
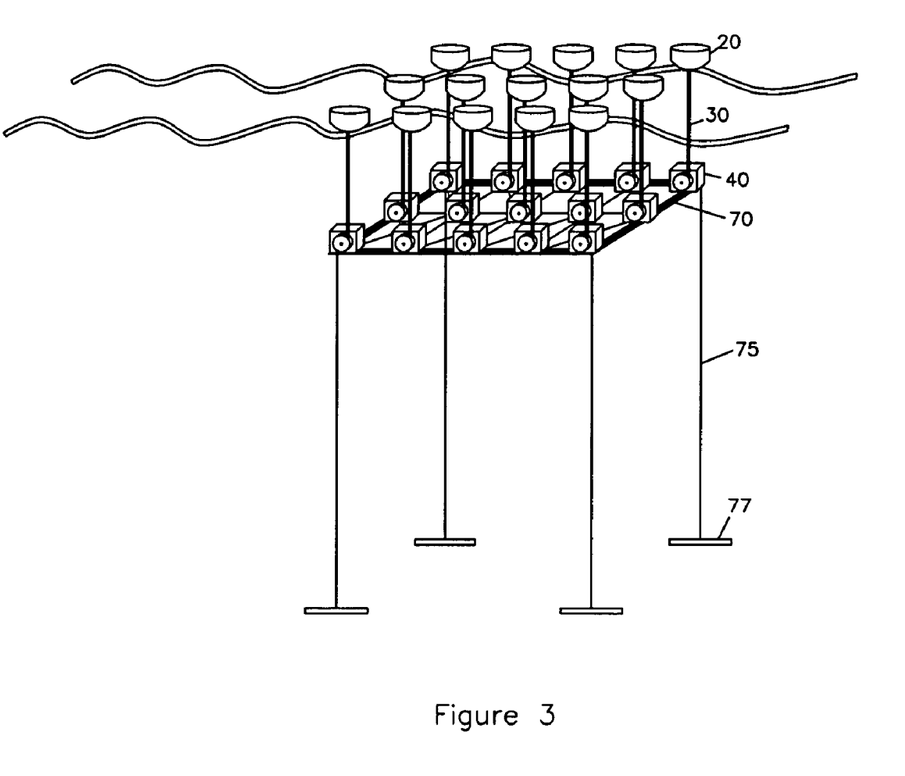
FIG. 3 is a schematic representation of an alternative embodiment of an ocean wave generator in accordance with the present invention.

Referring now to FIG. 3, an alternative arrangement of the ocean wave generator 10 is depicted. In this arrangement, the generators 40 of the ocean wave generator 10 do not sit on the seabed S, but on a support frame 70. The support frame 70 is moored to the seabed S via a mooring line 75, which is moored to the seabed S at a mooring anchor 77.

Figure 4:
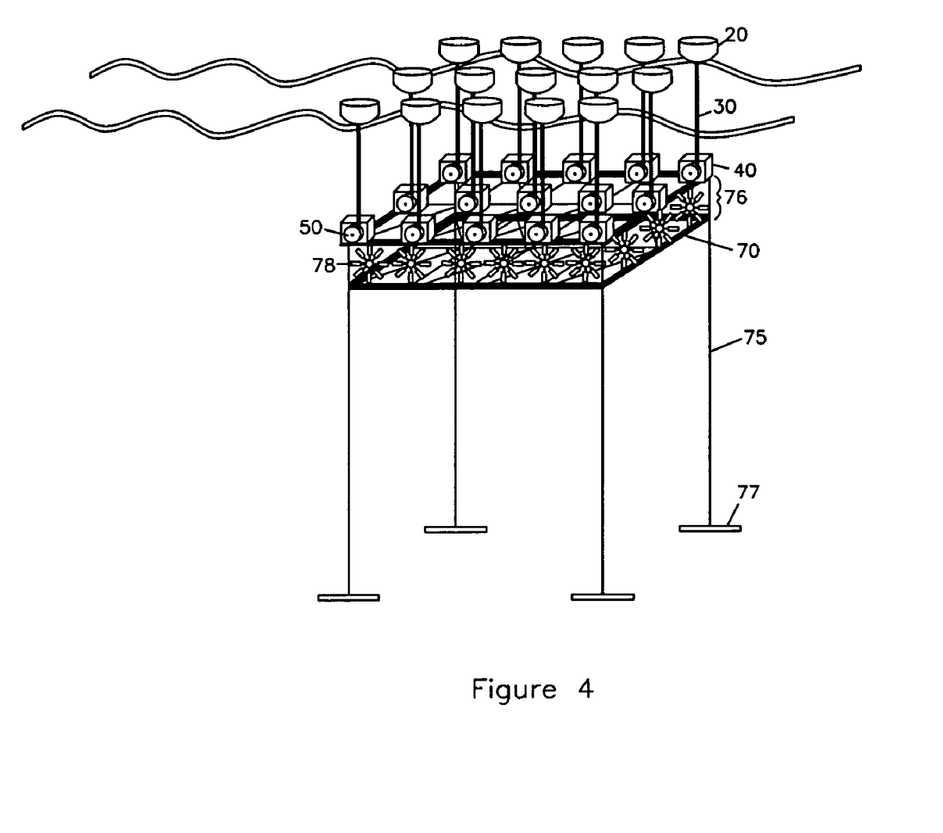
FIG. 4 is a schematic representation of the ocean wave generator of FIG. 3 depicting a current catcher section.

Referring now to FIG. 4, the alternative arrangement of the ocean wave generator 10 is depicted with a current generator portion 76. The current generator portion 76 has a plurality of current generators 78. In a preferred embodiment of the present invention, the current generators 78 are operatively attached to the shafts 46 to turn the rotors 42 of their respective generators 40 as the ocean current turns the current generators 78. However, it can be seen by one of ordinary skill in the art that the current generators 78 can generate electricity separate from the wave generators. The support frame 70 is, in a preferred embodiment a buoyant anti-heave support frame.

Figure 5:
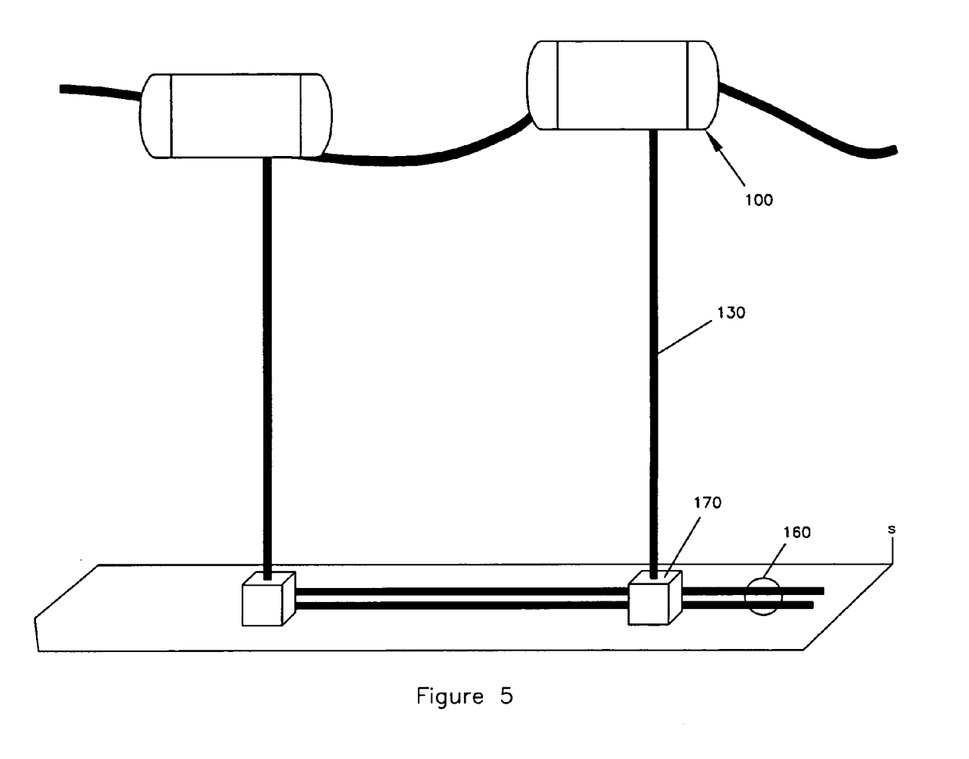
FIG. 5 is a schematic representation of an ocean wave generator having a generator mounted inside a surface buoy.
Figure 6:
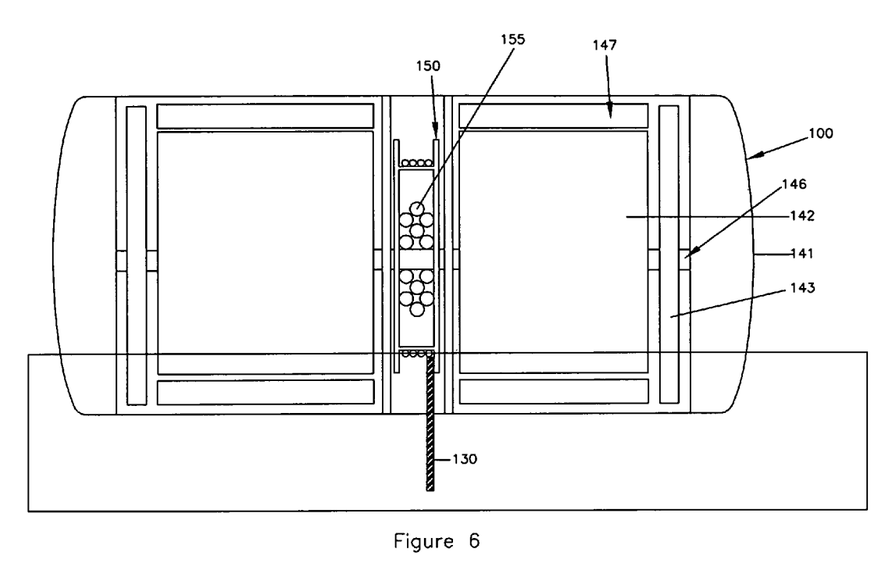
FIG. 6 is a partial cross-section view of the ocean wave generator buoy of FIG. 5.

Referring now to FIGS. 5 and 6, an alternative embodiment of an ocean wave generator 100 is depicted. An anchor cable 130 is attached to the underside of the ocean wave generator 100 at one end, and is connected to an anchor 170 on the other end of the anchor cable 130. The anchor 170 rests on the seabed S. Power cables 160 run from the anchor 170 to carry energy generated by the ocean wave generator 100 for consumption.

The ocean wave generator 100 includes a case 141, which houses the majority of the operative components of the generator. Disposed within the case 141 is a rotor 142 which is connected to a shaft 146. The shaft 146 runs generally along the central axis of the case 141. Located generally centrally along the shaft 146 is a pulley 150. The pulley 150 has an end of the anchor cable 130 wrapped around it and rotates as the anchor cable 130 pulls the pulley 150.

The operation of the pulley 150 is more fully described as follows. The pulley 150 is mounted on the shaft 146 such that when the pulley 150 rotates in a first direction, the pulley 150 rotates the shaft 146, and thereby rotates the rotor 142 within a stator 147, thereby generating electricity. When the pulley 150 rotates in a second, and opposite direction of rotation from the first direction, the pulley 150 rotates freely about the shaft 146, without turning the shaft 146 in the second direction. In a preferred embodiment of the present invention, the pulley 150 rotates in the first direction during the rising of the ocean wave generator 100 during an ocean wave crest, which pulls the anchor cable 130 in an upward direction in relation to the anchor 170. As the ocean wave generator 100 falls during an ocean wave trough, a coil spring 155 winds the anchor cable 130 back around the pulley 150 preparing it for the next pull. In this embodiment of the present invention, power is transmitted along the anchor cable 130 to the power cables 160.

A flywheel 143 mounted inside the case 141 and to the shaft 146 continues to rotate the rotor 142 during the ocean wave troughs. In this manner, the rotor 142 is able to rotate during both ocean wave crests and troughs, and thereby generate a more constant power output. The case 141 in a preferred embodiment is sealed to avoid corrosion and degradation of the components within, and is filled with an inert gas such as nitrogen.

Figure 7:
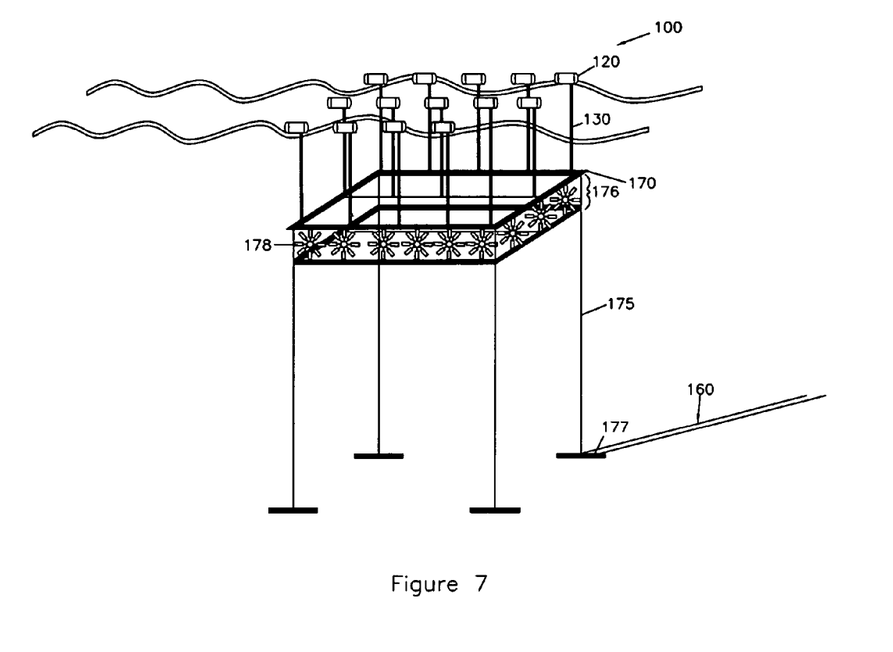
FIG. 7 is a schematic representation of an alternative arrangement of an ocean wave generator having a generator mounted inside a surface buoy.

Referring now to FIG. 7, an alternate arrangement of ocean wave generators 100 is depicted with a current generator portion 176. An anchor cable 130 is attached to the underside of the ocean wave generator 100 at one end, and is connected to an anchor support frame 170 on the other end of the anchor cable 130. The anchor support frame 170, in a preferred embodiment, is a buoyant anti-heave support frame similar to the support frame 70 as described in FIG. 4. The anchor support frame 170 is moored to the seabed S via a morring line 175, which is moored to the seabed S at a mooring anchor 177.

The current generator portion 176 has a plurality of current generators 178 which, in a preferred embodiment of the present invention, are operatively attached to the shafts 146 to turn the rotors 142 of their respective generators 140 as the ocean current turns the current generators 178. However, the current generators 178 can also independently generate electricity from the ocean's current. Power cables from both the wave 100 and current generators 178 can be supported by the support frame 170 and by the mooring lines 175 prior to being connected to the set of power cables 160 to transfer the energy generated for consumption. In a preferred embodiment of the present invention, the current generators are described in U.S. patent application "Current Power Generator", filed on May 19, 2005 by Donald H. Gehring, and is incorporated in its entirety by reference herein.

In view of the foregoing disclosure, some advantages of the present invention can be seen. For example, a novel ocean wave generator is disclosed. The novel ocean wave generator allows for the utilization of the crests and troughs of an ocean wave to generate electricity.

While the preferred embodiment of the present invention has been described and illustrated, modifications may be made by one of ordinary skill in the art without departing from the scope and spirit of the invention as defined in the appended claims. For example, in a preferred embodiment of the present invention, a unidirectional pulley is used to turn the shaft of the rotor. However, any means known to one of ordinary skill in the art may be employed, such as a series of gears. Additionally, the flywheel is described as being disposed within the chamber of the generator, but one of ordinary skill in the art can readily see that the flywheel could be placed on the outside of the chamber.

What is claimed is:

1. An ocean wave power generating apparatus, comprising:
    a buoy floating on a surface of an ocean;
    an electrical generator mounted to the buoy for upward and downward movement with the buoy in response to waves;
    a uni-directional pulley mounted on the generator for rotating the generator in a first direction when the pulley rotates in the first direction and for allowing the generator to continue rotating in the first direction when the pulley rotates in a second direction;
    a spring in engagement with the pulley for urging the pulley to rotate in the second direction;
    an anchor line having an upper end wrapped around the pulley and a lower end anchored, so that upward wave movement of the buoy pulls on the anchor line to cause the pulley to rotate in the first direction, and downward wave movement of the buoy causes the spring to rotate the pulley in the second direction to rewind the anchor line;
    a submerged support frame;
    at least one mooring line extending from the support frame to a sea floor for retaining the support frame below sea level; and wherein
    the lower end of the anchor line is secured to the support frame.

2. The apparatus according to claim 1, further comprising an ocean current generator mounted to the support frame for generating electrical power in response to ocean currents.

3. The apparatus according to claim 1 wherein the generator has a housing that is filled with an inert gas.

4. An ocean wave power generating apparatus, comprising:
    a buoy floating on a surface of an ocean;
    two stators mounted to the buoy;
    a rotor rotatably mounted in each of the stators for generating electricity when rotated;
    a single shaft coupled to both rotors for rotating the rotors in unison;
    a uni-directional pulley mounted to the shaft between the rotors for rotating the rotors in a first direction when the pulley rotates in the first direction and for allowing the rotors to continue rotating in the first direction when the pulley rotates in a second direction;
    a spring in engagement with the pulley for urging the pulley to rotate in the second direction;
    an anchor line having an upper end wrapped around the pulley and a lower end anchored, so that upward wave movement of the buoy pulls on the anchor line to unwind the anchor line and cause the pulley to rotate in the first direction, and downward wave movement of the buoy causes the spring to rotate the pulley in the second direction to rewind the anchor line while the rotors continue rotating in the first direction;
    a submerged support frame;
    at least one mooring line extending from the support frame to a sea floor for retaining the support frame below sea level; and wherein
    the lower end of the anchor line is secured to the support frame.

5. The apparatus according to claim 4, further comprising an ocean current generator mounted to the support frame for generating electrical power in response to ocean currents.

6. The apparatus according to claim 4 wherein the stators and rotors are located within an inert gas atmosphere.

7. An ocean wave power generating apparatus, comprising:
    a plurality of buoys floating on a surface of an ocean;
    an electrical generator mounted to each of the buoys;
    a uni-directional pulley mounted to each of the generators for rotating the generators in a first direction when the pulley rotates in the first direction and for allowing the generators to continue rotating in the first direction when the pulley rotates in a second direction;
    a spring in engagement with each of the pulleys for urging the pulleys to rotate in the second direction;
    a submerged support frame;
    a plurality of mooring lines extending from the support frame to a sea floor for retaining the support frame below sea level; and
    an anchor line for each of the buoys, each of the anchor lines having an upper end wrapped around one of the pulley and a lower end secured to the support frame, so that upward wave movement of the buoys pulls on the anchor lines to cause the pulleys to rotate in the first and downward wave movement of the buoys releases tension in the anchor lines to cause the springs to rotate the pulleys in the second direction to rewind the anchor lines.

8. The apparatus according to claim 7, further comprising a plurality of ocean current generators mounted to the support frame for generating electrical power in response to ocean currents.

9. The apparatus according to claim 7 wherein each of the generator is located within a housing that is filled with an inert gas.

* * * * *